United States Patent [19]

Salemie

[11] Patent Number: 5,548,957
[45] Date of Patent: Aug. 27, 1996

[54] RECOVERY OF POWER FROM LOW LEVEL HEAT SOURCES

[76] Inventor: Bernard Salemie, 8913 Hilton Hill Dr., Lanham, Md. 20706

[21] Appl. No.: 419,280

[22] Filed: Apr. 10, 1995

[51] Int. Cl.⁶ .................................................. F03G 6/00
[52] U.S. Cl. .............................. 60/641.8; 60/651; 60/665; 60/671; 60/676
[58] Field of Search .................................. 60/651, 664, 665, 60/671, 676, 531, 641.8; 417/52, 208, 209

[56] References Cited

U.S. PATENT DOCUMENTS

| | | | |
|---|---|---|---|
| 2,230,917 | 2/1941 | Triana | 417/208 |
| 3,888,084 | 6/1975 | Hawkins | 60/614 |
| 3,943,719 | 3/1976 | Terry et al. | 60/655 |
| 4,006,595 | 2/1977 | Forbes | 60/651 |
| 4,109,469 | 8/1978 | Carson | 60/676 |
| 4,122,680 | 10/1978 | Isshiki et al. | 60/649 |
| 4,134,265 | 1/1979 | Schlueter | 60/516 |
| 4,177,651 | 12/1979 | McFarland | 62/238.1 |
| 4,255,934 | 3/1981 | Stephenson | 60/655 |
| 4,281,969 | 8/1981 | Doub, Jr. | 417/52 |
| 4,347,702 | 9/1982 | Tawse | 60/618 |
| 4,437,312 | 3/1984 | Newton et al. | 60/648 |
| 4,503,682 | 3/1985 | Rosenblatt | 60/671 |

Primary Examiner—Leonard E. Heyman
Attorney, Agent, or Firm—Dennison, Meserole, Pollack & Scheiner

[57] ABSTRACT

A system based on a refrigeration cycle for converting low grade heat into useful work. A plurality of pressure vessels are interconnected with a common high pressure feed manifold and a common low pressure return manifold, A fluid pressure driven motor is connected across the manifolds. The system is charged with a volatile refrigerant. By sequentially heating and cooling the pressure vessels and directing the flow with a series of valves, a pressure differential is maintained across the manifolds to drive the fluid pressure motor.

16 Claims, 4 Drawing Sheets

FIG. 3

RECOVERY OF POWER FROM LOW LEVEL HEAT SOURCES

BACKGROUND OF THE INVENTION

The invention relates to a system to generate power from a low level heat source. A steadily increasing demand for energy has placed considerable pressure on our gas, oil, and coal supplies, as well as creating a number of environmental problems. Alternate energy sources, such as nuclear, solar, hydroelectric and geothermal, are being pressed into service.

A second approach involves energy conservation. Total energy demand has been reduced by increasing the efficiency of motor vehicles, home appliances lighting and the heating of homes and commercial buildings.

A third approach involves energy recovery A significant portion of energy in electrical power generation, industrial processes, and comfort heating and cooling is lost to the atmosphere as waste heat. This follows from the laws of thermodynamics which state that efficiency increases with the temperature of the working medium, and in conventional design, it is not economically feasible to use heat below a predetermined temperature level.

A fourth approach involves building a reliable power generation station with zero, or near zero, emissions. A problem in today's society involves the extensive use of energy changing machines that emit massive amounts of pollution in our air, streams, and ground. Therefore, creating reliable, almost inexhaustible, low grade heat generating plants with zero emissions, or near zero emissions, will greatly assist in halting this pollution.

Much research and development is presently taking place to partially recover the vast amount of energy which is now being wasted as low grade heat. The present invention is directed to such a heat recovery system.

A number of patents have been issued dealing with this problem. U.S. Pat. No. 3,888,084, issued on Jun. 10, 1975, to Gilbert Hawkins, shows a system to recover waste heat from an automobile engine. Coolant water is heated in the water jacket of the engine and flows in heat exchange relationship with a closed Freon system. The heated Freon is raised in pressure to drive a motor which returns work to the engine.

U.S. Pat. No. 4,006,595, issued on Feb. 8, 1977, to William J. Forbes, shows a heat source for superheating Freon to drive a turbine. A pair of pressurized storage tanks are used alternately as a source and sink for the Freon.

U.S. Pat. No. 4,177,651, issued on Dec. 11, 1979, to Lorrell C. McFarland, shows a Freon driven engine powered by a heat source derived from solar energy. The Freon engine drives a conventional air conditioning compressor.

While the above mentioned patents do teach some energy recovery systems, the prior art does not teach a system having the flexibility of application and the overall efficiency of the disclosed invention.

SUMMARY OF THE INVENTION

The principal object of the invention is to employ a closed refrigeration cycle driven by a temperature differential created by a source of low grade heat and a cooling liquid to supply a high pressure fluid to drive a fluid driven motor/turbine.

It is another object of the invention to arrange at least three pressure vessels in a refrigeration system, each vessel being connected to a common high pressure feed refrigerant manifold and a common low pressure refrigerant return manifold. A fluid driven motor is connected across the high and low pressure manifolds. A heat exchanger (or multiple heat exchangers) is hermetically sealed within each pressure vessel to supply each vessel with heating or cooling fluid so that the vessels sequentially serve as a source or sink for refrigerant. It should be noted that more than one heat exchanger may be used in the same pressure vessel where heating fluid and cooling fluid are not desired to mix, such as heat from nuclear waste and lake water coolant.

It is a specific object of the invention to arrange a process controller to automatically control the fluid control valves to automate the system.

It is an object of the invention to supply each pressure vessel with a high and low liquid level control to sequentially establish the changeover between source and sink for each pressure vessel.

It is another object of the invention to supply heated waste water directly to the heat exchangers, or alternatively, to supply heated liquid from a closed loop in heat exchange relationship with any source of heat.

BRIEF DESCRIPTION OF THE DRAWINGS

Figure 3:
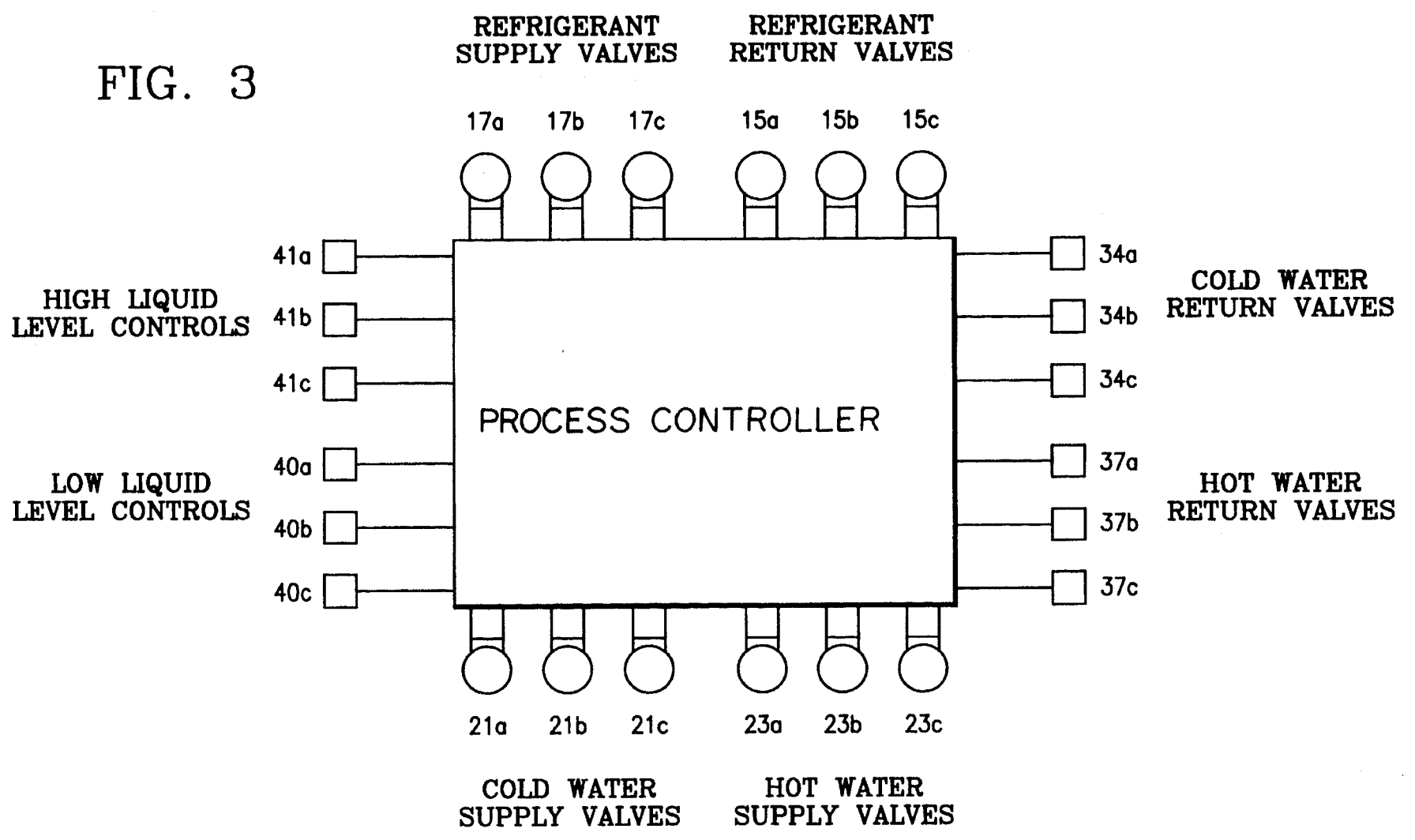

FIG. 3 is an electrical schematic showing all of the components connected to a process controller.

DESCRIPTION OF PREFERRED EMBODIMENTS

Figure 1A:
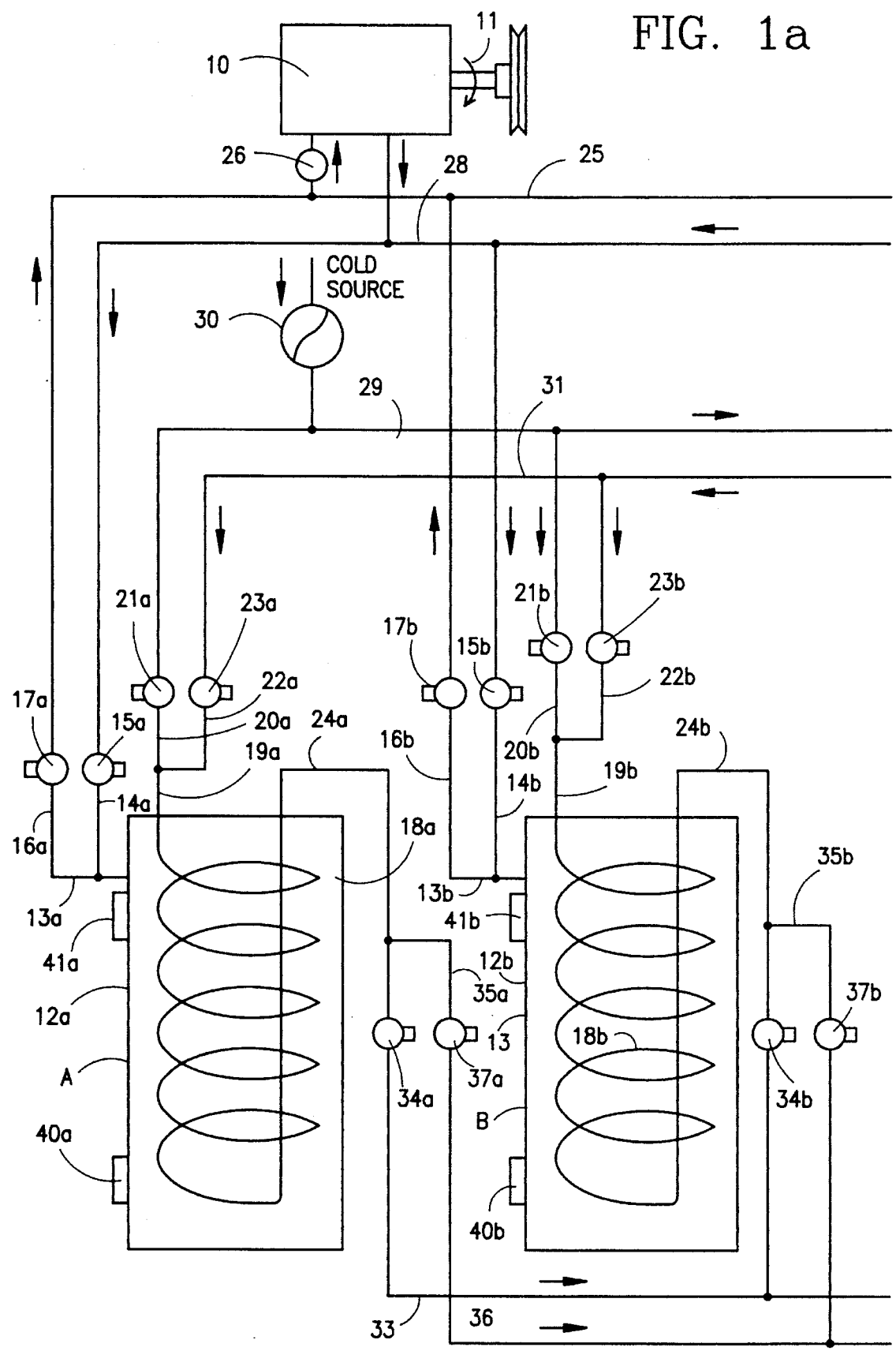
FIGS. 1a and 1b, when placed side by side, show a schematic diagram of the overall heat recovery system.
Figure 1B:
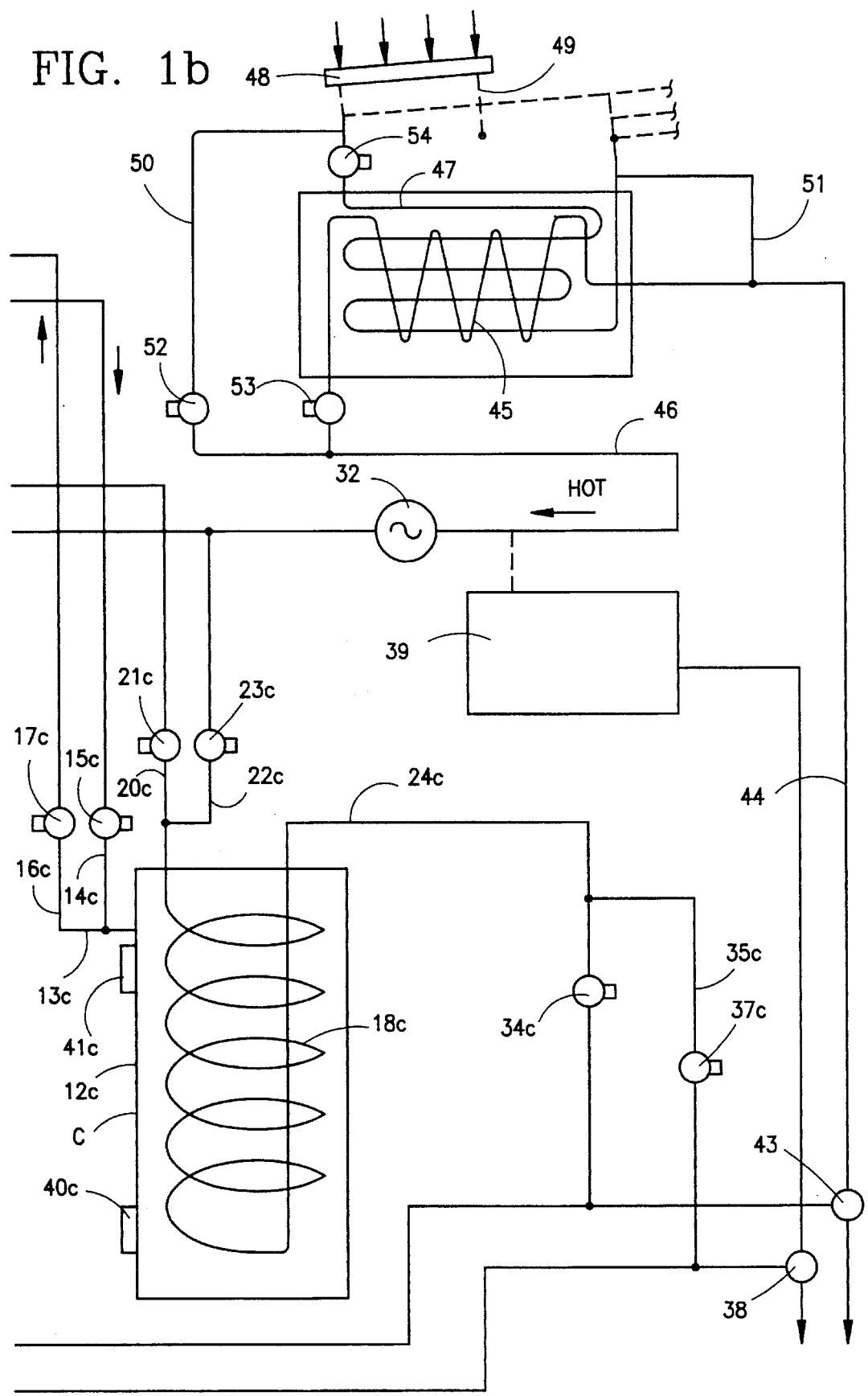

FIGS. 1a and 1b show a schematic diagram of the overall system. Three pressure vessels A, B, C are piped together in a system to supply pressure to drive a fluid driven motor 10. The convention will be followed of indicating a fluid connection between different pipes by means of a dot at the interconnection. A simple line crossover without a dot indicates piping isolation at that point.

The motor 10 may be of any fluid driven type including, but not limited to, a rotary vane type, turbine, or reciprocating piston. An output shaft 11 is coupled to any useful load, such as, but not limited to, an electrical generator, refrigeration compressor, or water pump.

Each pressure vessel is designed to handle the pressure generated by the thermodynamic fluid employed. While (R-22) refrigerant was employed in the initial design, it should be clearly understood that many other refrigerants, such as R134A, AZ50, or any equivalent substitutes, may also be used. Temperature intensity is not paramount. The important consideration is that the thermodynamic fluids employed must generate sufficient pressure from temperature differentials such that a pressure differential exists on the fluid so as to supply sufficient pressure to operate the motor/turbine. The size of the pressure vessels will depend on the size of the overall system which can vary from 3 horsepower on up.

Figure 2:
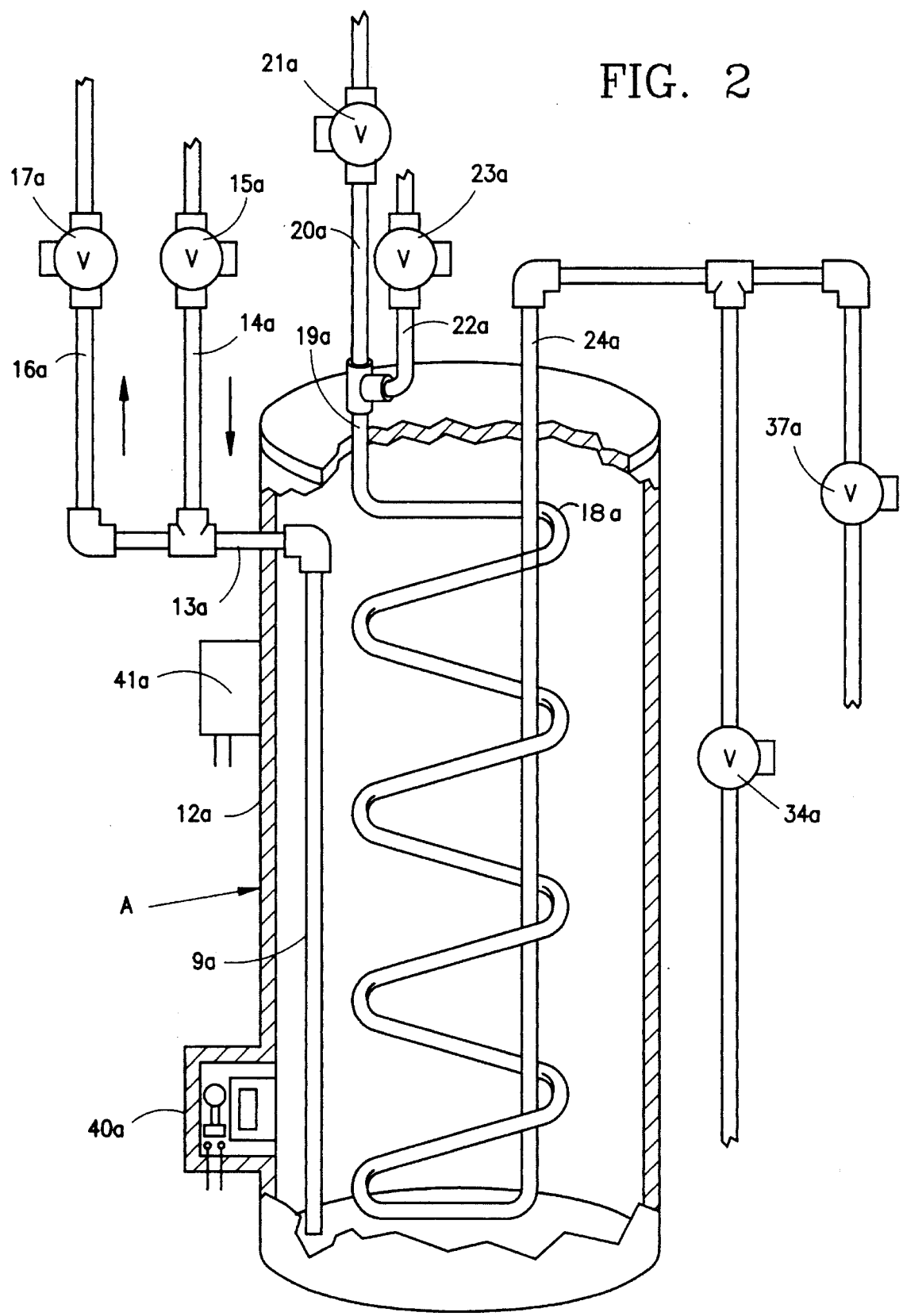
FIG. 2 is a part schematic view of a pressure vessel and internal heat exchanger.

FIG. 2 is an enlarged view of pressure vessel A showing the internal details. Since pressure vessels A, B, and C are the same, the same reference numerals with the subscripts a, b, or c will be used to designate similar components.

Pressure vessel A comprises a conventional tank 12a selected of a size and wall thickness to match the specific application. A pipe 13a is brazed or welded into a top portion of the tank to provide for refrigerant flow into and out of the tank. In the position shown in FIG. 2, pipe 13a will draw refrigerant liquid from the bottom of the tank. For this purpose a dip tube 19a is provided which is coupled to the outlet of pipe 13a and extends to 1" from the bottom of the pressure vessel. As will be explained hereinafter, the disclosed system can also operate on refrigerant vapor pressure, and to enable this alternative mode of operation, pipe 13A can extend directly into the top of the tank as shown in FIGS. 1a and 1b where it can draw vapor from the top of the tank.

A refrigerant return line 14a is connected to pipe 13a to permit return flow of refrigerant into pipe 13a and tank 12a. Return refrigerant flow in line 14a is controlled by a valve 15a. This valve may be of any suitable commercially available type, such as a motorized ball valve or a motorized gate valve.

A refrigerant pressure feed line 16a is connected to pipe 13a to permit pressurized fluid to flow from the tank. A valve 17a, similar to valve 15a, is mounted in line 16a to control flow.

A heat exchanger coil 18a is mounted within tank 12a to vaporize or condense the refrigerant in the tank depending upon the particular phase in the overall cycle. An inlet pipe 19a passes through the tank and connects with heat exchanger 18a for the purpose of introducing cooling fluid from pipe 20a into the heat exchanger to condense the refrigerant vapor. A valve 21a, similar to valve 15a, controls the inlet condensing fluid. A pipe 22a connects with pipe 19a for the purpose of introducing heating fluid into the heat exchanger to vaporize the refrigerant. A control valve 23a, similar to valve 15a, controls the inlet vaporizing fluid. A pipe 24a passes through the tank and connects with the outlet of the heat exchanger to convey the discharged fluid from the heat exchanger to be reheated or otherwise used to be later described.

Refrigerant pressure lines 16a, 16b, and 16c feed a common high pressure manifold 25. This manifold will always be pressurized as one of the tanks A, B, or C will always be in a heating mode supplying high pressure refrigerant to manifold 25. Fluid driven motor 10 is connected to the high pressure manifold 25 via a governor controlled modulating valve 26. This valve is a conventional component and modulates the fluid flow to maintain a preset rotational speed of the motor 10 in the same manner as practiced in steam turbine control. The high pressure fluid after performing work in the motor is reduced in pressure and is discharged via discharge pipe 27 and then to the low pressure manifold 28.

Pressure lines 16a, 16b and 16c can be pressurized with liquid refrigerant or with a refrigerant in the vapor phase depending upon the construction of motor 10. When the design of motor 10 is such that it is driven most efficiently with liquid refrigerant, each tank is equipped with a dip tube 9 coupled to pipe 13 as previously explained and shown in FIG. 2. On the other hand, if motor 10 is more efficiently operated with refrigerant in the vapor phase, the dip tube will not be used and vapor will be drawn off directly from the top of the tank in FIGS. 1a and 1b.

Refrigerant return lines 14 (a,b,c) are connected to manifold 28 to return the fluid discharged from motor 10 to one of the tanks A, B, or C which is in the condensing mode at the time.

Coolant fluid is supplied to the heat exchangers 18 (a,b,c) by means of lines 20 (a,b,c) which are connected to a common coolant manifold 29 with cooling fluid which typically is water obtained from wells, closed circuit wells, streams, natural bodies of water, public water or from a cooling tower. A pump, if used, is schematically shown at 30.

Heating fluid is supplied to the heat exchangers 18 (a,b,c) by means of lines 22 (a,b,c) which are connected to a common heating manifold 31. The heating fluid is typically heated water obtained from sources of abundant low grade heat.

Return lines 24 (a,b,c) are connected to a common cold return manifold 33. Valves 34 (a,b,c), similar to valves 15a, are installed in respective lines 24 (a,b,c) to control the flow to return manifold 33 which is arranged to discharge into a well or stream or return to cold source. A three way valve 43 is mounted at the discharge end of cold manifold 33 to divert the flow for a purpose to be later described.

Return lines 35 (a,b,c) are connected to respective lines 24 (a,b,c) upstream from valves 34 (a,b,c) and discharge into a common hot manifold 36. Valves 37 (a,b,c) are installed in respective lines 35 (a,b,c) to control the discharge into the hot manifold 36.

The terms "cold" and "hot" as applied to return manifolds 33 and 36 are used in a relative sense. The temperature of the discharge fluid from the outlet of the heat exchangers 18 (a,b,c) will be higher in the evaporation mode than in the condensing mode because of the initially higher temperature of water being pumped by pump 32. It is for this reason that the discharge fluid from the cold return lines 24 (a,b,c) is divided into two parallel paths. The discharge from hot manifold 36 can flow into a natural drain, or can be optionally diverted by a three-way valve 38 to a closed heat exchange loop. As shown in FIG. 1b, water from hot manifold 36 is diverted to flow through an external heat exchanger 39 to pick up waste heat such as may be found in hot industrial waste gases.

In similar fashion, cold manifold 33 can discharge directly into a well or stream or can be optionally diverted by three-way valve 43 to discharge into pipe 44 feeding a cold return exchanger coil 45. The outlet of coil 45 is connected with pipe 46 feeding fluid to the inlet of pump 32. A heat exchange coil 47 is arranged in heat exchange relationship with coil 45. Coil 47 is connected to a conventional solar collector system 48. Hot fluid supplied by the solar collector is circulated through coil 47 to elevate the temperature of the fluid circulating in coil 45.

A source of hot fluid from an independent process heater 49 may optionally be piped in parallel with the solar collector and valved off in conventional fashion so hot fluid can be obtained separately from the solar collector, the process heater, or both.

Bypass lines 50 and 51 along with valves 52, 53 and 54 are provided so as to enable bypassing heat exchanger 45 and 47 in favor of directly heating the cold return fluid in the solar collector or process heater, or both.

Each tank A, B, C has a low liquid level sensor 40 (a,b,c) mounted near the bottom to sense when the liquid level drops to a predetermined low level requiring a change in the cycle. Each tank also has a high liquid level sensor 41 (a,b,c) to sense a predetermined high liquid level requiring another change in the cycle.

A step-by-step operational description will now be given. Assume a low grade heat water inlet temperature of about 120° F. and an outlet temperature of about 110° F. and a cold source condensing water temperature inlet of 55° F. and an outlet temperature of 65° F. With the process controller 42 activated, a cycle of operation begins with tank A full of liquid refrigerant up to outlet 13a. All control valves are normally closed unless specifically stated as being open The process controller opens valves 23a and 37a permitting hot water from hot water manifold 31 to flow through the heat exchanger 18a to return line 36 causing the temperature of the liquid refrigerant in tank A to approach the water temperature of 110° F. Concurrently, valve 15b of tank B is opened allowing return fluid from manifold 28 to enter the tank. Cold water supply valve 21b along with cold return valve 34b are in an open position allowing cold water from cold manifold 29 to circulate through heat exchanger 18b to cold return line 33. Refrigerant control valve 17a is opened permitting high pressure refrigerant to enter manifold 25 and governor 26 to activate the fluid motor 10 to perform useful work. The refrigerant is reduced in pressure as it performs work in the motor and is discharged into low pressure manifold 28 and then returns through valve 15b to tank B to be condensed into a liquid.

Assuming the use of R-22 and a cold water outlet temperature of 65° F. and a hot water outlet temperature of 110° F., the saturated pressures of R-22 at 65° F. and 110° F. are approximately 112 p.s.i and 226 p.s.i., respectively. The pressure differential driving motor 10 would be (226–112) or 114 p.s.i.

During phase 1 of the cycle, motor 10 is driven by refrigerant pressure generated in tank A and condensed in tank B.

Phase 2 of the cycle commences when the liquid level in tank B contacts top liquid level float sensor 41b. The process controller responds by opening refrigerant return inlet valve 15c and cold water valves 21c and 34c to circulate cold water through heat exchanger 18c of tank C. Refrigerant return valve 15b is closed along with cold water supply valve 21b and cold water return valve 34b. At the same time, hot water supply valve 23b and hot water return valve 37b are opened changing tank B from the condensing mode to a pressurization mode. The fluid pressure generated in tank A now flows in manifold 28 to tank C.

During phase 2 of the cycle, motor 10 is driven by refrigerant pressure generated in tank A and condensed in tank C.

Phase 3 of the cycle commences when the condensed refrigerant in tank C reaches the bottom liquid level float control 40c. The process controller responds by closing refrigerant supply valve 17a of tank A and opening refrigerant supply valve 17b of tank B. Refrigerant under pressure from tank B enters manifold 25, then motor 10, then manifold 28 through valve 15c to condense in tank C. At the same time, hot water valves 23a and 35a of tank A are closed and cold water valves 21a and 34a are opened to place tank A on a standby condensing mode.

During phase 3 of the cycle, motor 10 is driven by refrigerant pressure generated in tank B and condensed in tank C.

Phase 4 of the cycle commences when high liquid level float control 41c of tank C is energized. The process controller responds by closing refrigerant return valve 15c of tank C and opening refrigerant return valve 15a of tank A. At the same time, cold water valves 21c and 34c of tank C are closed and hot water valves 23c and 37c are opened. Tank C is now placed on a standby pressure generating mode while high pressure refrigerant flows from tank B to tank A.

During phase 4 of the cycle, motor 10 is driven by refrigerant pressure generated in tank B and condensed in tank A.

Phase 5 begins when low liquid level control 40a is energized by the liquid refrigerant condensing in tank A. The process controller responds by closing refrigerant supply valve 17b of tank B and opening refrigerant supply valve 17c of tank C. At the same time, hot water valves 23b and 37b close and cold water valves 21b and 34b open to place tank B on a standby condensing mode.

During phase 5 of the cycle, motor 10 is driven by refrigerant pressure generated in tank C and condensed in tank A.

Phase 6 of the cycle commences when the liquid refrigerant level in tank A reaches the top liquid level float control 41a. The process controller responds by closing refrigerant return valve 15a of tank A and opening refrigerant return valve 15b of tank B. At the same time, cold water valves 21a and 34a of tank A close and hot water valves 23a and 37a open placing tank A on a standby mode.

During phase 6 of the cycle, motor 10 is driven by refrigerant pressure generated in tank C and condensed in tank B.

Phase 7 of the cycle begins when low level liquid float control 40b of tank B is energized. The process controller responds by closing refrigerant supply valve 17c of tank C and opening refrigerant supply valve 17a in tank A. At the same time, hot water valves 23c and 37c close and cold water valves 21c and 34c open placing tank C on a standby condensing mode.

During phase 7 of the cycle, motor 10 is driven by refrigerant pressure generated in tank A and condensed in tank B.

The sequence of operation as described above is repeated when high liquid level control 41b of tank B is energized.

Although the invention has been described with reference to a specific embodiment, many variations will be apparent to those skilled in the art, without departing from the scope of the invention as described in the following claims.

I claim:

1. A method for converting low grade heat into useful work, said method comprising connecting a set of three pressure vessels to a common high pressure feed manifold and a common low pressure return manifold, connecting a fluid pressure driven motor across said manifolds, said vessels, said manifolds and said motor forming a sealed system, charging said system with a volatile refrigerant, providing fluid flow controlling valves between said pressure vessels and said manifolds, and sequentially heating and cooling selected vessels with concomitant valve operation to maintain a continuous pressure differential across said fluid pressure driven motor and further providing a high and low liquid level control for each pressure vessel and wiring said liquid level controls and said fluid control valves into a central process controller to automatically maintain said pressure differential.

2. The method of claim 1 wherein said high and low liquid level controls when activated determine the sequential pattern of heating and cooling of said pressure vessels.

3. A system for generating power from a source of low grade heat comprising a plurality of pressure vessels, said vessels connected to a common high pressure manifold and a common low pressure manifold, valve means in fluid control relationship between each vessel and said manifolds, a fluid pressure driven motor connected across said manifolds, said vessels, manifolds and motor forming a closed refrigeration system, a volatile refrigerant charged into said system, said refrigerant existing in the liquid and vapor phases, means to sequentially heat and cool the pressure vessels to maintain a pressure differential across said manifolds; and said means to sequentially heat and cool the pressure vessels including a refrigerant liquid level sensor to sense the refrigerant level in each vessel.

4. A system as claimed in claim 3 wherein said means to sequentially heat and cool the pressure vessels includes a heat exchanger mounted internally of each pressure vessel.

5. A system as claimed in claim 4 wherein said heat exchangers are connected to a common heating manifold and a common cooling manifold.

6. A system as claimed in claim 5 wherein the outlet of each heat exchanger is connected to a common cold return manifold, and a common hot return manifold, valve means in said return manifolds to selectively direct the flow.

7. A system to recover low grade heat comprising at least three pressure vessels, each vessel being connected to a common high pressure feed manifold and a common low pressure return manifold, a fluid pressure driven motor connected across said manifolds, said vessels, manifolds and motor forming a closed refrigeration system, a volatile refrigerant including a liquid and vapor phase charged into said refrigeration system, each pressure vessel being equipped with a low level and high level refrigerant liquid sensor to sense the refrigerant liquid in each vessel, a heat exchanger isolated from but conductively associated with each pressure vessel to supply each vessel with heating or cooling fluid so that the vessels sequentially serve as a source or sink for the refrigerant, valve means in fluid control relationship with said pressure manifolds and heat exchangers for effecting said sequential operation of said pressure vessels; and wherein said valve means includes a valve pair connected to a heating manifold to supply heating fluid and a cooling manifold to supply cooling fluid to said pressure vessels.

8. A system as claimed in claim 7 wherein the outlet of each heat exchanger is in fluid communication with a hot return manifold and a cold return manifold and said valve means in fluid control relationship with said heat exchangers includes an outlet valve pair for each heat exchanger to selectively divert flow to said hot return manifold or said cold return manifold.

9. A system as claimed in claim 8 wherein said hot return manifold is provided with a diverter valve which can discharge the hot return fluid to a drain or optionally divert it to a heat exchanger coil in heat exchange relationship with a source of heat, the outlet of the heat exchanger coil being connected to the inlet of the hot manifold.

10. A system as claimed in claim 8 wherein said cold return manifold 33 is provided with a cold return diverter valve 43 which can discharge the cold return fluid to a drain or optionally divert it to a heat exchanger coil 45 in heat exchange relationship with a source of heat from a solar collector, the outlet of said heat exchanger coil 45 being connected to the inlet of said hot manifold 31.

11. A system as claimed in claim 10 including a source of process heat 49 connected in parallel relationship with said source of heat from said solar collector.

12. A system as claimed in claim 11 including bypass lines 50, 51 and bypass valves 52, 53, 54 to bypass said solar heat exchanger coils 45, 47.

13. A system as claimed in claim 7 including a process controller connected to said valve means and each of said low level and high level refrigerant liquid sensors to fully automate operation of the system.

14. A system as claimed in claim 7 wherein said fluid pressure driven motor is driven by vaporous refrigerant and the high pressure feed manifold is connected to each pressure vessel by means of an internal pipe located at a top portion of the vessel.

15. A system as claimed in claim 7 wherein said fluid pressure driven motor is driven by liquid refrigerant and the high pressure feed manifold is connected to each pressure vessel by means of an internal dip tube.

16. A system as claimed in claim 7 including a pressure modulating valve between said fluid pressure driven motor and said high pressure feed manifold.

* * * * *